(12) United States Patent
Menard et al.

(10) Patent No.: US 6,952,648 B1
(45) Date of Patent: Oct. 4, 2005

(54) POWER DISRUPTION INDEX

(75) Inventors: James Lee Menard, Hudson, NH (US); Stephen Anthony Massa, Billerica, MA (US); John Gerard Bosse, Maynard, MA (US); Paul Douglas Drewniak, Tewksbury, MA (US)

(73) Assignee: WSI Corporation, Andover, MA (US)

( * ) Notice: Subject to any disclaimer, the term of this patent is extended or adjusted under 35 U.S.C. 154(b) by 98 days.

(21) Appl. No.: 10/743,251

(22) Filed: Dec. 22, 2003

Related U.S. Application Data

(60) Provisional application No. 60/444,700, filed on Feb. 4, 2003.

(51) Int. Cl.[7] ............... G06F 169/00; H02J 13/00
(52) U.S. Cl. ............... 702/3; 700/286; 702/4; 703/18
(58) Field of Search ............... 702/2, 3, 4, 60–62, 702/22, 286, 291; 703/2, 18; 73/170.24

(56) References Cited

U.S. PATENT DOCUMENTS

| | | | |
|---|---|---|---|
| 5,673,366 A * | 9/1997 | Maynard et al. | 706/14 |
| 6,671,654 B1 * | 12/2003 | Forth et al. | 702/182 |
| 2002/0116139 A1 * | 8/2002 | Przydatek et al. | 702/62 |

OTHER PUBLICATIONS

Billinton, R., et al., "Reliability assessment of transmission and distribution systems considering repair in adverse weather conditions", IEEE CCECE 2002, May 12-15, 2002, pp. 88-93.*

Goel, L., et al., "Impacts of adverse weather on reliability worth indices in subtransmission systems using deterministic as well as probabilistic criteria", IEEE Power Engineering Society General Meeting, Jul. 13-17, 2003, pp. 269-274.*

Shen, B., et al., "Modeling extreme-weather-related transmission line outages", IEEE Electrical and Computer Engineering, 1999 IEEE Canadian Conference, May 9-12, 1999, pp. 1271-1276.*

* cited by examiner

*Primary Examiner*—Donald McElheny, Jr.
(74) *Attorney, Agent, or Firm*—Woodcock Washburn LLP

(57) ABSTRACT

Systems and methods for determining a power disruption index indicative that provides subscribers with a forecast of weather conditions that are likely to cause interruptions to power distributions systems within their specific areas of service. The Power Disruption Index (PDI), is a calculation of a number of forecast weather parameters including severe thunderstorm probabilities and intensities, wind speeds, wind gusts, and snowfall and ice accretion. The index combines each of these input parameters with a specific weighting based on the forecast intensity of each of the parameters, along with alert threshold criteria provided by each client utility. The output PDI is a forecast of local weather conditions for a specific local service area or power distribution network.

37 Claims, 5 Drawing Sheets

Wind = 1 m/s

POWER DISRUPTION INDEX

CROSS-REFERENCE TO RELATED APPLICATIONS

The present invention claims the benefit of priority of U.S. Provisional Application No. 60/444,700 filed Feb. 4, 2003.

FIELD OF THE INVENTION

The present invention relates to severe weather forecasting. In particular, the present invention is directed to a system and method of utilizing forecast parameters to provide an indication of anticipated power disruptions in service area.

BACKGROUND OF THE INVENTION

The impact of weather forecast information on power generation can be substantial. For example, many different types of weather conditions may cause power outages ranging from sporadic to widespread. In the utility industry severe weather is a weather event that directly causes widespread outages to a utility's distribution system, or in a worst case, causes extensive damage to a utility's transmission and distribution system. Storm events may leave hundreds of thousands of customers without power and the cost of restoration could be in the millions of dollars.

Utilities utilize severe weather forecasts to plan and mobilize resources to meet the anticipated challenges of storm restoration. Power companies will try to stage materials and restoration crews in areas that will likely experience outages and damage. This results in a concentration of available crews and materials that are ready to begin restoration work immediately after the passage of a storm through a region. This also reduces the total storm outage time for customers in the affected regions. However, because of the changing nature of storms and weather forecasting, utilities do not always stage equipment and personnel in the appropriate locations.

Improvements in severe weather forecasts of major events such as hurricanes, winter storms, and severe thunderstorms can aid utility managers in resource scheduling and materials management. Further, utilities that focus on excellence in customer service will retain customers as the electric utility industry moves into a more competitive market.

Thus, there is a need for improvements in weather forecasting from temperature forecasts to severe weather events that will aid in a utility's ability to recover from storm events. This will advantageously reduce costs and outage time, while increasing a utility's efficiency such that cost savings can be passed on to customers and systems can be improved. The present invention provides for such a system.

SUMMARY OF THE INVENTION

The present invention is directed to systems and methods for determining a severity of power disruptions in a geographic region in accordance with weather conditions. In accordance with a method, the present invention is directed to receiving weather prediction models; generating input layers representative of convective intensity, winds and winter weather conditions; and determining a power disruption index value from the input layers.

According to a feature of the invention, generating the input layer representative of convective intensity includes determining if convective available potential energy is greater than 1000 J/kg; determining if storm relative helicity greater than 100 $m^2/s^2$; determining if 0–6 km wind shear is greater than 20 kts; and determining 12-hour pressure falls at 18,000 feet. Generating the input layer representative of convective intensity may also include determining if convective available potential energy is greater than 1000 J/kg; and determining if 0–6 km wind shear is greater than 20 kts. Generating the input layer representative of convective intensity may also include determining if temperatures at 10,000 feet are less than 12° C.; determining if a K-index is greater than 30; and determining if a lifted index is less than zero.

According to another feature, generating input layers representative winds comprises determining wind speeds and wind gusts. Determining input layers representative of wind gusts may include determining if a mean of the winds from 1000 to 5000 ft; determining a rate at which the temperature cools from 1000 to 5000 ft, and if the rate exceeds 7° C. per km, then subtracting 5 kts from the mean of the winds. Alternatively, determining input layers representative of wind gusts may include deriving the mean wind speed maxima from MesoETA and GFS models; calculating mean values from the 850 decameter height millibar pressure level to surface level; and plotting the calculated mean values as a the input layers representative of wind gusts.

According to yet another feature, determining input layers representative of snow accumulation includes averaging snow, rain, ice pellet, and freezing rain probabilities for a predetermined period of time; outputting a model quantitative precipitation field where a snow conditional probability is higher than all other precipitation conditional probabilities; averaging a surface temperature for the predetermined period of time; converting the model quantitative precipitation field into snowfall by using a 15:1 ratio if the average surface temperature is less than 28° F.; and converting the model quantitative precipitation field into snowfall a 10:1 ratio if the average surface temperature is greater than or equal to 28° F.

According to another feature of the invention, determining input layers representative of snow wetness includes determining a snowfall amount for a predetermined period of time; determining an average surface temperature for the predetermined period of time; and converting the snowfall amount and the average surface temperature to an index. Converting to the index includes setting the index to zero where less than 1" of snow is expected or the surface temperature is below 30.5° F.; assigning the index to one where greater than 1" of snow is expected and average surface temperatures are forecast between 30.5° F. and 32.1° F.; and assigning the index to two when greater than 1" of snow is expected and average surface temperatures are forecast to be greater than 32.1° F.

According to a feature of the invention generating input layers representative of ice accretion includes calculating ice accretion rates as a function of wind speed by determining an averaging the model conditional freezing rain, rain, ice pellet, and snow probabilities for a predetermined period; outputting a model quantitative precipitation field for any point where the freezing rain conditional probability is higher than all other precipitation conditional probabilities; determining an average surface temperature for the predetermined period; converting the output quantitative precipitation field into accretion by using 80% of the liquid precipitation if the average surface temperature for the predetermined period is below 27° F.; and converting the output quantitative precipitation field into accretion by using 66% if the average surface temperature is at or above 27° F. for the predetermined period.

According to a feature of the invention determining the power disruption index value from the input layers includes comparing input values of the input layers to determine a highest value of all the input values; and assigning the power disruption index value to the highest value.

According to yet another feature, the method may include editing the input layers if an aspect of the expected weather conditions for a specific region are not accurate in the input layers.

According to another aspect of the invention, there is provided a system for determining a power disruption index representative of a severity of power outages based on weather conditions in a geographic region. The system includes a central computing receiving weather prediction models, and a forecast and programming server that generates input layers representative of convective intensity, winds and winter weather conditions, the forecast and programming server utilizing the input layers to determine the power disruption index. A graphics production server produces end-user graphical representations of weather conditions forecast by the input layers, and a communications link provides the power disruption index to subscribers. The system may perform the processes of the method above.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings.

DETAILED DESCRIPTION OF ILLUSTRATIVE EMBODIMENTS

The present invention provides consumers, such as utility companies, with a forecast of weather conditions that are likely to cause interruptions to power distribution systems within their areas of service. The present invention provides a Power Disruption Index (PDI), which is a determination of a severity of power outages based on a number of forecast weather parameters including, but not limited to: severe thunderstorm probabilities and intensities, wind speeds, wind gusts, and snowfall and ice accretion. The PDI combines each of these input parameters with a specific weighting based on the forecast intensity of each of the parameters, along with alert threshold criteria provided by each customer. The output PDI is a forecast of local weather conditions for a specific local service area or power distribution network.

Figure 1:
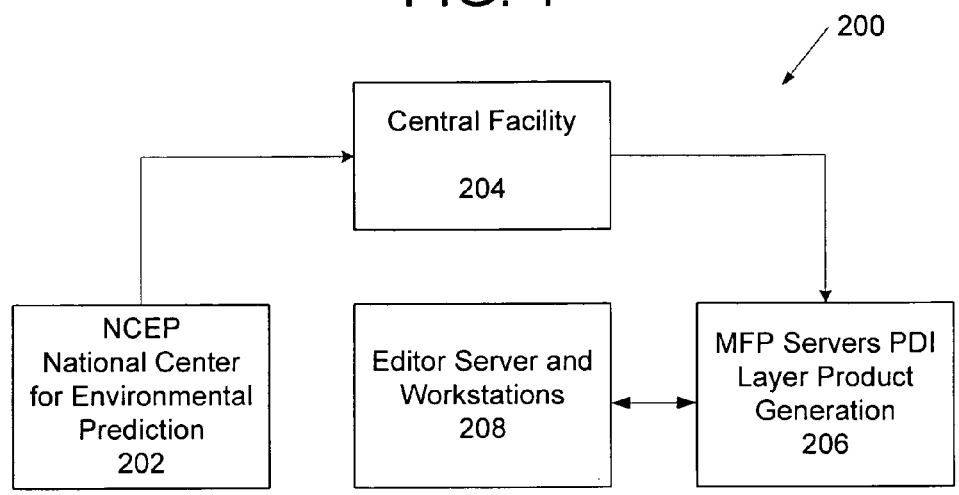
FIG. 1 is an overview of the data flow and processing in accordance with the present invention.

FIG. 1 illustrates the MesoETA data delivery and intake process 200. The MesoETA NWP grid data are received from the National Center for Environmental Prediction (NCEP) 202 and stored within a central facility computer 204. The input datasets and initial forecasts for each of the PDI Input Layers are generated utilizing the NCEP/National Center for Environmental Prediction MesoETA Numerical Weather Prediction model. The MesoETA model output data is received preferably in grid format via the Family of Services HRS Service, as well as the NOAAport Family of Services satellite delivered Service.

A series of computer systems within the central facility 204 are specifically responsible for the generation of Input Layer forecast guidance products. The systems include a MFP (MetOps, Forecast and Programming) Server, an Automated Production Graphics (APG) server, and an Interactive Production Graphics (IPG) server. The system architecture utilized by the present invention provides reliability, redundancy, and maintainability. The MFP is a pair or redundant server machines sharing a RAID5 disk, which is a highly reliable and redundant hard disk drive solution.

The MFP server acts as a host machine to several client machines, known internally as APG's (Automatic Product Generators) or IPG's (Interactive Product Generators). The APG or IPG client machines mount to the MFP server via NFS (network file system), a Unix protocol. In the present implementation, there are 30 combined APG and IPG systems. All of the client machines share a version of WSI Corporation's WEATHERproducer software served from the MFP. All processes and users of any of the APG or IPG systems have access to all data products (Image, Grid, Text), and products produced on the MFP by other users of the MFP. This results in a cross-departmental workstation environment. As will be described in greater detail below, the servers are configured to generate PDI input products from the MesoETA computer model upon data arrival into the central facility 204.

Each of the Input Data Layers are generated on the MFP Servers 206 using, e.g., WSI Corporation's WEATHERproducer workstation software. Wind speed guidance are derived directly from the MesoETA model, while convective intensity, wind gust and snow and ice guidance layers are generated utilizing WEATHERproducer application known as grid algebra product derivation. The grid algebra product derivation enables various calculations to be made to the gridded model input forecast parameters, as will be described below. The resultant derived product can be generated in a number of output formats including grid, graphic and discreet point data, etc., enabling the derived product to be displayed a number of ways. Each of the PDI Input Layers is output as a grid layer set prior to being transferred to a forecast center for manual editing, if necessary. The final result is a PDI value between, e.g., 0 and 4 that represents the severity of the outages (none/very few, scattered, moderate, heavy and severe). Using the PDI value for a particular location, utility companies can strategically deploy repair crews and equipment to more quickly restore service to their customers.

As noted above, the present invention performs calculations to the gridded model input forecast data. Each of the calculations used in the generation of the Input Layers will now be described.

1. Convective Intensity Input Layer

Three equations are used to generate the convective intensity (CI) Input Layer. Equation 1 accounts for convective available potential energy (atmospheric buoyancy) greater than 1000 J/kg, storm relative helicity (low-level wind shear) greater than 100 m$^2$/s$^2$, 0–6 km wind shear greater than 20 kts, and 12-hour pressure falls at 18,000 feet.

Equation 2 accounts for convective available potential energy (atmospheric buoyancy) greater than 1000 J/kg, and 0–6 km wind shear greater than 20 kts.

Equation 3 accounts for temperatures at 10,000 feet less than 12° C., K-index (accounts for atmospheric moisture and instability) greater than 30, and lifted index less than zero.

The output of these equations is directed to areas in the MesoETA model where convective precipitation is forecast. To assist forecasters in assessing thunderstorm threats where the MesoETA model does not generate precipitation, a guidance layer is also generated within the MFP Server, and made available within an editor workstation. The guidance layer uses the same equations above, however, it is not limited to areas where the MesoETA model generates convective precipitation.

2. Sustained Wind Speeds Input Layer

This Layer is modeled using raw, unaltered, MesoETA model data.

3. Wind Gust Input Layer

This Layer is modeled using the mean of the winds from 1000 to 5000 ft and the rate at which the temperature cools from 1000 to 5000 ft. If this rate exceeds 7° C. per km, then the mean layer wind above is used minus 5 kts.

Alternatively, this layer may be modeled by deriving the mean wind speed maxima from the MesoETA and GFS models and calculating mean values from the 850 decameter height millibar pressure level to surface level. The output values are then plotted as the wind gust Input Layer.

4. Snow and Ice Input Layers

The PDI Index utilizes Input data for winter weather that may have the potential to generate excessive loading on power systems infrastructure leading to power outages. These factors involve heavy, wet snow of specific depths, ice accretion from freezing rain, and the effects of ice accretion combined with winds. Power lines and tree limbs laden with wet, sticky snow or ice accretion are often the cause of many localized power outages. During a major winter storm, these types of power interruptions can become widespread. Accordingly, the snow and ice Input Layers account for the affects that heavy, wet snow or ice may have on a power distribution system. The following defines the snow accumulation, snow wetness and ice accretion Layers.

Snow Accumulation Layer

The snowfall algorithm generates the snowfall accumulation grid for input into the PDI. The calculation may utilize data from the Global Forecast System (GFS) or MesoETA models from National Center for Environmental Prediction (NCEP). The MesoETA model is preferably used as the guidance input into the algorithm, but the GFS or a blend of the two models may be used when deemed necessary.

The snowfall input is determined as follows. The model conditional snow, rain, ice pellet, and freezing rain probabilities are averaged for a 6 hour period. Where the snow conditional probability is higher than all other precipitation conditional probabilities, the model quantitative precipitation field is output for these points. Next, the average surface temperature for a 6 hour period is determined. The outputted quantitative precipitation field is then converted into snowfall by using a 15:1 ratio if the average surface temperature is less than 28° F., and 10:1 if the average surface temperature is greater than or equal to 28° F.

Thus, the snowfall input is determined in accordance with:

IF (SN>RA & SN>IP & SN>ZR)

THEN LSNOW=QPF

ELSE LSNOW=0

IF (SFCT<28)

THEN SNOW=LSNOW*15

ELSE SNOW=LSNOW*10 where the input variables are:
SN=model forecast average snow conditional probability for a 6 hour period.
RA=model forecast average rain conditional probability for a 6 hour period.
IP=model forecast average ice pellet conditional probability for a 6 hour period.
ZR=model forecast average freezing rain conditional probability for a 6 hour period.
QPF=model 6 hour quantitative precipitation forecast.
SFCT=model forecast average surface air temperature.

The output variables are:
LSNOW=liquid snow equivalent.
SNOW=snowfall amount.

The averages above are determined by summing three model output times within a 6 hour period and diving by 3. If only two periods are available within the 6 hour period, then the average is determined by summing two output times and dividing by 2.

Snow Wetness Layer

The snow wetness index is a factor from 0 to 2 that represents the "wetness" of snowfall during a 6 hour period. The snow wetness index is used in conjunction with the snowfall to modify the PDI. The snow wetness index is a function of surface temperature and forecast snowfall. The MesoETA or GFS computer models are preferably used as inputs. The values of the snow wetness index are as follows:
0=no wet snow
1=general wet snow
2=excessively wet snow The snow wetness index is determined by retrieving the 6 hour snowfall as generated by the snowfall algorithm and determining the 6 hour average surface temperature. A combination of surface temperatures and snowfall are converted into an index. The snow wetness index is zero for any case where less than 1" of snow is expected or the surface temperature is below 30.5° F. for any amount of snow. An index of 1 is assigned when greater than 1" of snow is expected and average surface temperatures are forecast between 30.5° F. and 32.1° F. An index of 2 is assigned when greater than 1" of snow is expected and average surface temperatures are forecast to be greater than 32.1° F.

Thus, the relationships for determining the snow wetness is as follows:

IF (SF>1 & T>=30.5 & T<32.1)

THEN SWI=1

IF (SF>1 & T>32.1)

THEN SWI=2

ELSE SWI=0 where the input variables are:
T=The 6 hour average surface temperature.
SF=The 6 hour snowfall as determined by the snowfall algorithm.

The output variable is:
SWI=Snow wetness Index.

The averages above are determined by summing three model output times within a 6 hour period and diving by 3. If only two periods are available within the 6 hour period, then the average is determined by summing 2 output times and dividing by 2.

Ice Accretion Input Layer

Figure 2:
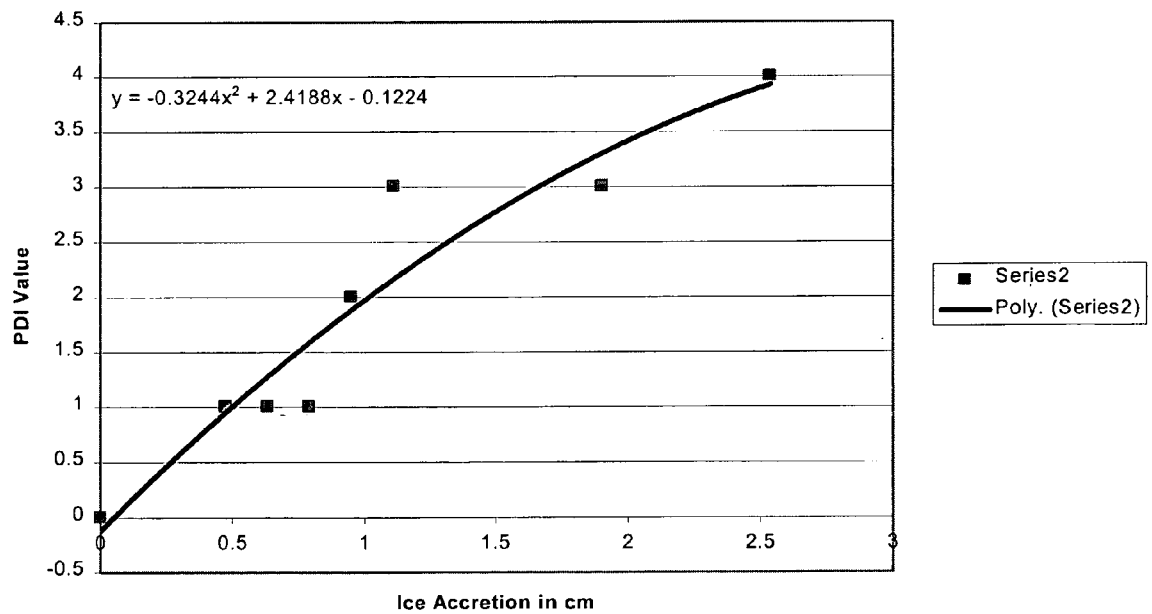
FIG. 2 illustrates the relationship between the power disruption index (PDI) value and ice accretion for a wind speed of 1 m/s.
Figure 3:
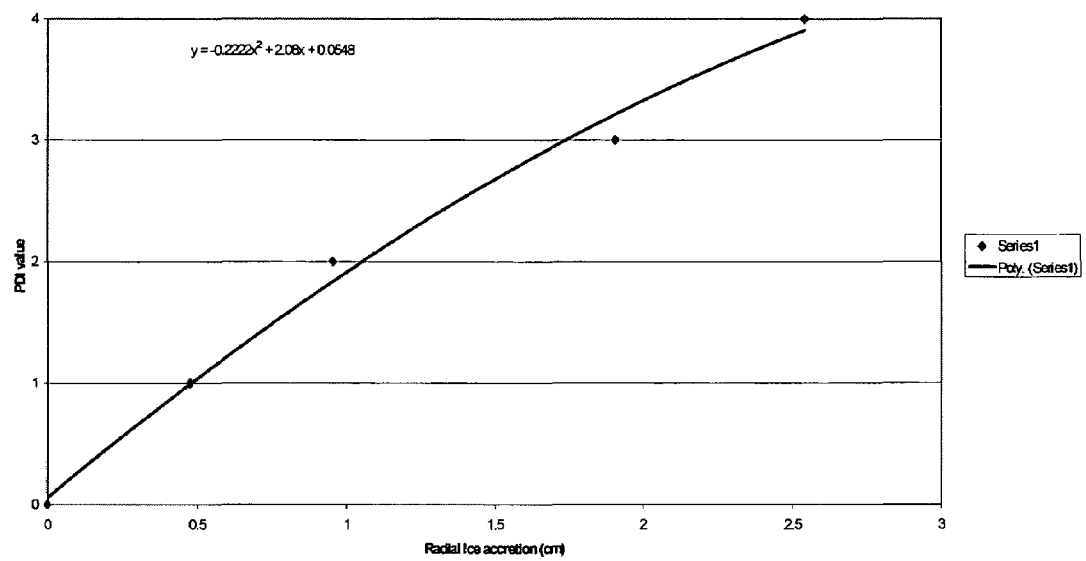
FIG. 3 illustrates the relationship between the power disruption-index (PDI) value and radial ice accretion where there is no wind.
Figure 4:
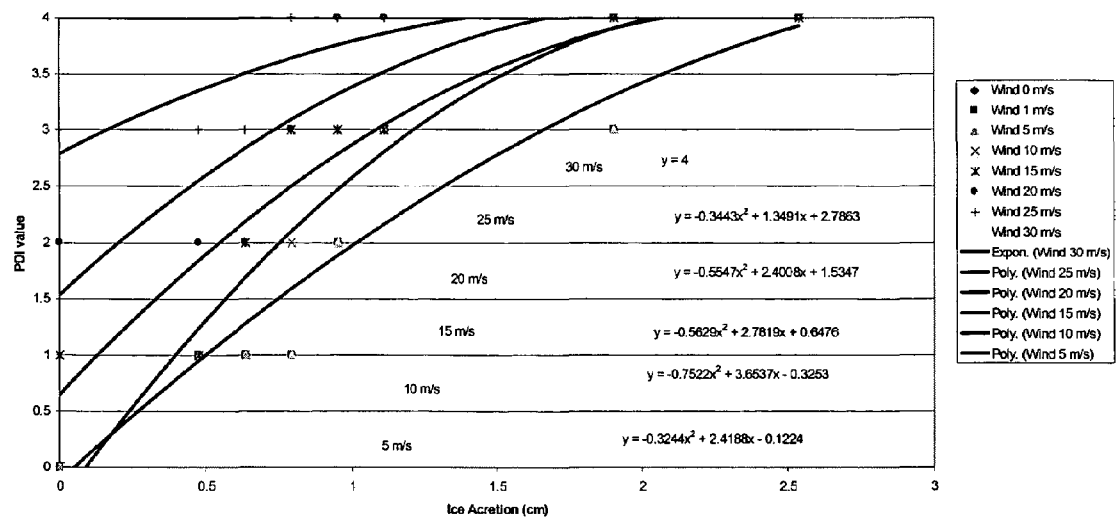
FIG. 4 illustrates the relationship between the power disruption index (PDI) value and ice accretion for various wind speeds.

Referring to FIGS. 2–4, the ice accretion Input Layer is determined by calculating ice accretion rates as a function of wind speed under various scenarios to depict the total number of possible weather scenarios. FIGS. 2–4 illustrate the various amounts of ice accretion vs. PDI value in accordance with wind speed for a slight wind of 1 m/s (FIG. 2), no wind (FIG. 3) and stronger winds of 5 m/s to 30 m/s (FIG. 4). The ice accretion algorithm generates the ice accumulation (accretion) grid for input into the PDI. The algorithm utilizes data from either the GFS or MesoETA models from NCEP. The MesoETA model is preferably the primary input into the algorithm, but may be the GFS or a blend of the two models when deemed necessary.

The ice accretion algorithm is determined by averaging the model conditional freezing rain, rain, ice pellet, and snow probabilities for a 6 hour period. Then, the model quantitative precipitation field is output at any point where the freezing rain conditional probability is higher than all other precipitation conditional probabilities. The average surface temperature for a 6 hour period is then determined. The output quantitative precipitation field is converted into accretion by using 80% of the liquid precipitation if the average 6 hour surface temperature is below 27° F., or 66% if the average 6 hour surface temperature is at or above 27° F.

Thus, the following describes the determination of the ice accretion Input Layer:

IF (ZR>RA & ZR>IP & ZR>SN)

THEN ICEL=QPF

ELSE ICEL=0

IF (SFCT<27)

THEN ICE=ICEL*0.8

ELSE ICE=ICEL*0.66 where the input variables are:
ZR=model forecast average freezing rain conditional probability for a 6 hour period.
SN=model forecast average snow conditional probability for a 6 hour period.
RA=model forecast average rain conditional probability for a 6 hour period.
IP=model forecast average ice pellet conditional probability for a 6 hour period.
QPF=model 6 hour quantitative precipitation forecast.
SFCT=model forecast average surface air temperature.

The output variables are:
ICEL=liquid ice equivalent.
ICE=accretion (ice accumulation).

The averages above are determined by summing three model output times within a 6 hour period and diving by 3. If only two periods are available within the 6 hour period, then the average is determined by summing 2 output times and dividing by 2.

Calculating points along the curves of FIGS. 2–4 is computationally expensive. Thus, in order to speed the determination of the PDI value based on ice accretion and wind speed, tabular look-up indices are used to represent the graphs of FIGS. 2–4 to calculate the ice accretion Input layers. The indices are shown in Tables 1–3, below.

TABLE 1

Wind Only - No Ice

| PDI Input | Wind Speed m/s | Wind Speed mph |
|---|---|---|
| 0 | <13.41 | <30 |
| 1 | 13.41–17.88 | 30–40 |
| 2 | >17.88–22.35 | 41–50 |
| 3 | >22.35–26.82 | 51–60 |
| 4 | >26.82 | >60 |

TABLE 2

For Ice with No Wind (wind speed <10 mph or 4.47 m/s)

| PDI Input | Wind Speed m/s | Ice Accretion cm | inches | fraction |
|---|---|---|---|---|
| 0 | <4.47 | 0 | 0 | 0 |
| 1 | <4.47 | 0.47625 | 0.1875 | 3/16 |
| 2 | <4.47 | 0.9525 | 0.375 | 3/8 |
| 3 | <4.47 | 1.905 | 0.75 | 3/4 |
| 4 | <4.47 | 2.54 | 1 | 1 |

TABLE 3

Ice and Wind

| PDI Input | Wind m/s | Radial Ice cm | Radial Ice inches | Radial Ice fraction |
|---|---|---|---|---|
| 0 | 0 | 0 | 0 | 0 |
| 1 | 8.941 | 0.4763 | 0.1875 | 3/16 |
| 2 | 13.41 | 0.635 | 0.25 | 1/4 |
| 3 | 15.65 | 0.7937 | 0.3125 | 5/16 |
| 4 | 17.88 | 1.111 | 0.4375 | 7/16 |

A forecaster editing workstation is used by meteorologists to provide an additional level of quality control in determining the PDI input guidance layers. The forecasters use the editor workstation 208 tool to manipulate the various Input Layers should an adjustment to the forecast guidance be necessary. The editor workstation 208 is preferably configured as a client/server application, running on a Sun platform supporting Solaris v 8.0.

In accordance with the present invention, the MFP Server 206 exports the PDI grid layers to the editor server. The input grid layers are converted to the NetCDF format and saved as NetCDF station-specific values. NetCDF (network Common Data Form) is an interface for array-oriented data access and a library that provides an implementation of the interface. The NetCDF library also defines a machine-independent format for representing scientific data.

Each of the NetCDF layers is configured into 20 km square Thiessen polygons or "stations." Each station is preferably congruent with the spatial grid scheme used within the MesoETA model. The editor displays these station-specific input values for editing by the forecasters. Forecasters editing each of the Input Layers and decide whether the computer model guidance accurately depicts the impact the various weather conditions may have on a particular region of the country. If the computer forecast is the best possible depiction of the timing and intensity of expected weather conditions for a given area, no changes are made to the Input Layers. If, however, an aspect of the expected weather conditions for a specific region of the country are not accurate, the forecasters may edit the appropriate Input Layers to best depict the timing and intensity of a specific weather event for a specific region of the country.

Forecasters may make such edits to the Input Layer data in accordance with the following non-limiting factors: the forecaster's background, experience and expertise, current and past model forecast biases with a particular weather parameter, current model performance with the weather event in question, current model performance with seasonal trends, and timing and intensity performance issues.

Where edits are necessary, the forecasters preferably edit three of the four primary MesoETA model runs (the 00Z, 12Z and 18Z cycles). The data from the 06Z cycle may be edited as resources allow. Forecasters typically will edit the convective intensity (CI) layer, and wind speed and wind gust layers during more synoptically driven large-scale events. Examples of a major weather event requiring wind layers editing include, but are not limited to, widespread severe weather outbreaks due to synoptic forcing, major winter or spring storms generating sustained winds over 25 mph across a service area, and land-falling tropical systems.

Each editing session consists of a review of ETA model data performance against initialization with real-time and short-fused data sets. Forecasters focus on adjusting Input Layer data to align with ground truth through the first 0 to 2 hours of the required PDI data set. Forecasters preferably provide hourly edits for the first 12 hours of "active" Input Layer data. "Active" Input Layer data are values which imply some level of potential power disruption for a particular geographical location. This 12-hour window is of most value to the utilities for operational crew management, scheduling and deployment.

An updated forecast is performed as many times as needed using the editor workstation 208 between the primary update times. Once the primary edit session has been completed, saved and released, forecasters may advance the editor client display for a particular service area each hour. The current hour's forecast for PDI input is displayed on the editor workstation 208 at all times. Forecasters may manually adjust the time scale and note of any changes to Input Layer forecasts across a particular service area to adjust the layers accordingly as the time shift progresses.

A forecaster may adjust data during an intermediate sessions. One reason for this is that the hourly convective intensity verification shows a lack of convective risk (aerial coverage or intensity levels) or excessive convective risk. Another is that the forecast "thinking" changes requiring an update of the forecast convective risk or wind speed/gusts. An update of the CI layer to reflect a developing thunderstorm which is producing lightning sooner than expected may be a third reason. A fourth reason is a change in timing of a fast-moving thunderstorm line. Also, forecasters may adjust data to reduce or remove an area of forecast thunderstorms which have not developed as expected. Finally, the wind layer guidance may not be representative of the actual winds expected or observed during a land falling tropical weather system. The above listing is not intended to exhaustive, as there may be other reasons why a forecaster may edit session data.

Intermediate adjustments are preferably extrapolated into the future for the next 2 to 3 hours of PDI Input Layer forecasts. Each of the three primary edit sessions of ETA model guidance, along with various numbers of intermediate updates over the course of the day, provide customers with accurate forecasts of weather conditions likely to cause power interruptions of varying intensities.

Once forecasters have completed edits of input data, the NetCDF formatted files are converted back to the grid format and returned to the MFP Servers 206.

Figure 5:
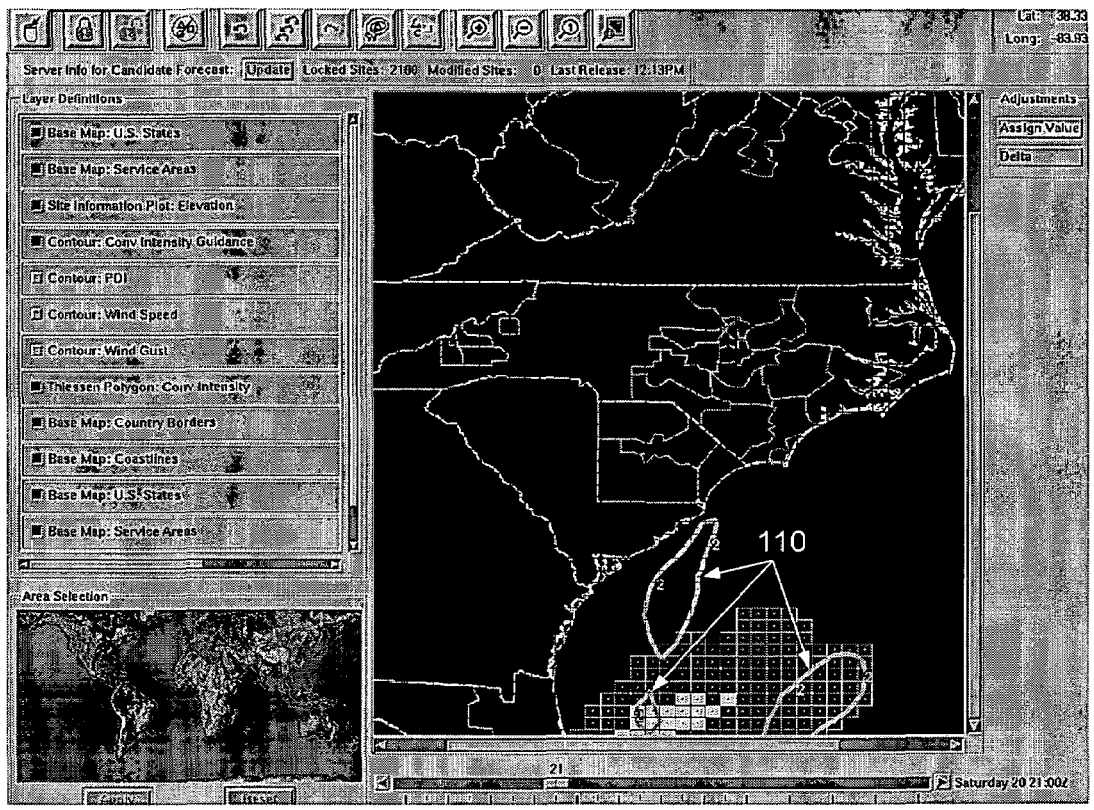
FIGS. 5–8 illustrate exemplary graphical user interfaces provided by an editor workstation that represent Input Layer data.
Figure 6:
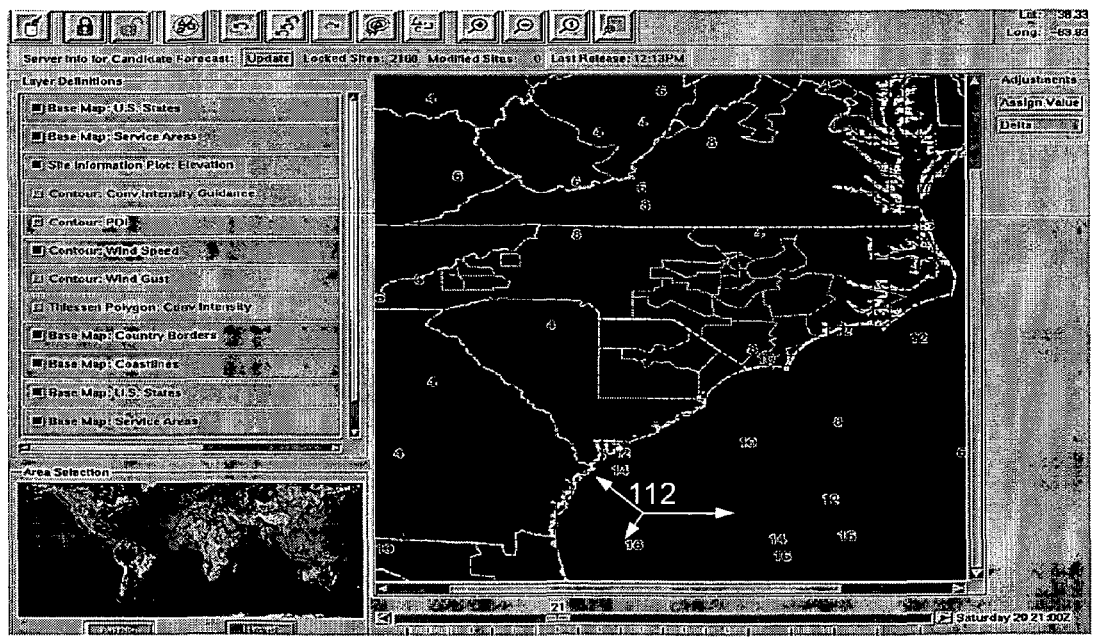
Figure 7:
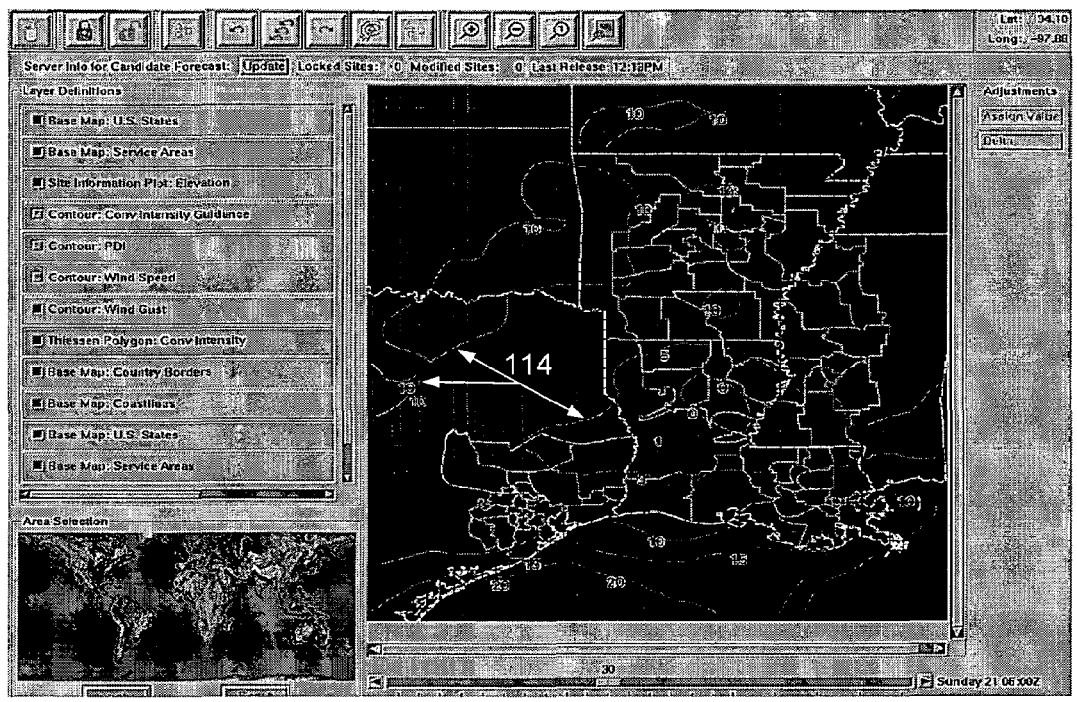
Figure 8:
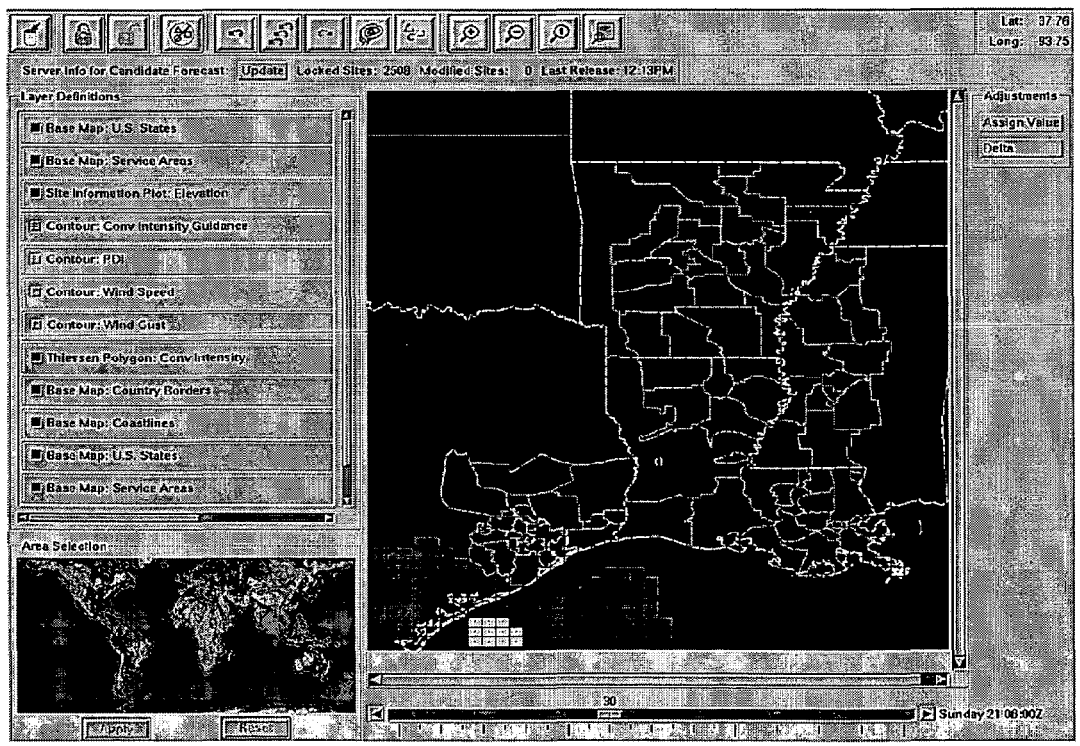

With reference to FIGS. 5–8, edits are made via the editor workstation 208 user interface. FIG. 5 illustrates the convective intensity input data layer within the editor workstation user interface. The convective intensity guidance contour is shown as reference numeral 110. FIG. 6 illustrates the wind speed input data layer within the editor workstation user interface. Lines of equal forecast wind speeds, or Isotachs are by reference numeral 112. It is noted that not all Isotachs are identified by reference numeral 112 for reasons of clarity. FIG. 7 illustrates an image depicting the wind gust input data layer within the editor workstation user interface. Lines of equal forecast wind gusts are indicated by reference numeral 114. Again, here it is noted that not all lines of equal forecast wind gusts are identified by reference numeral 114 for reasons of clarity. FIG. 8 illustrates an image depicting the convective intensity input data layer within the editor workstation user interface for a different region of the country than FIG. 5.

After each of the input data is transferred back to the MFP servers a look-up sequence is performed to determine whether any of the point-specific input data have exceeded predefined thresholds and have become "active" PDI values. An "active" PDI value is a value which is greater than zero (0), which implies some level of potential power disruption for a particular geographical location. Once this identification process is complete, the assignment of actual PDI Index value is performed using the PDI Index Generation table as shown in Table 4:

TABLE 4

| PDI | 0 | 1 | 2 | 3 | 4 |
|---|---|---|---|---|---|
| Wind Speed (mph) | <30 | >=30 | >=40 | >=50 | >=60 |
| Wind Gusts (mph) | <30 | >=30 | >=40 | >=50 | >=60 |
| Convective Intensity | 0 | 1 | 2 | 3 | 4 |
| GENL TSTM or | <15 | >15 | >15 | >15 | >15 |
| SVR1 or | 0 | 0 | >=1, <27 | >=27, <45 | >=45 |
| SVR2 | 0 | >=1 | >=1 | >=1 | >=1 |
| Winter Parameters | | | | | |
| Ice Accretion (cm); Wind < 4.47 m/s | 0 | 0.476 | 0.95 | 1.9 | 2.54 |

Ice Accretion w/wind    Wind units (m/s), Ice (ice) units in (cm)
5 <= ws < 10           PDI = −0.3244ice^2 + 2.4188*ice − 0.1224
10 <= ws < 15          PDI = −0.7522ice^2 + 3.6537*ice − 0.3253
15 <= ws < 20          PDI = −0.5629ice^2 + 2.7819*ice − 0.6476
20 <= ws < 25          PDI = −0.5547ice^2 + 2.4008*ice − 1.5347
25 <= ws < 30          PDI = −0.3443ice^2 + 1.3491*ice − 2.7863

TABLE 4-continued

| PDI | 0 | 1 | 2 | 3 | 4 |
|---|---|---|---|---|---|
| ws > 30 | | PDI = 4 if ice < 1.1 cm | | | |
| Snow Accumulation (cm) | | Snow Impact equation: | | | |
| | | PDI = (Snow(cm)*SWI)/15 | | | |
| Snow Wetness Index SWI | | | | | |
| 0 | N/A | N/A | N/A | N/A | N/A |
| 1 | <6 | 6 | 12 | 18 | 24 |
| 2 | <3 | 3 | 6 | 9 | 12 |

Snow Amounts in above table in inches

In accordance with the present invention, the PDI Index value is derived by comparing all of the single input values for a given location, as indicated above. The highest PDI Index value of all of the Input Values is given the most weight for a specific location, and is assigned the final PDI Index value. After the PDI Index is assigned for a geographic region, a series of end-user graphics, or tabular and textual products may then generated within the MFP Server 206, or derived within the Forecast Engineering Development web systems, and transferred to the various remote weather systems via, e.g., a satellite channel to inform customers of potential power disruptions.

The criteria above used in generating the PDI Index calculations have been acquired through a process involving customer input, years of operational experience with a number of leading operational transmission and distribution utilities, forecaster experience and input, post mortem storm analyses, performance assessment and storm verification data.

Exemplary Computing Environment

Figure 9:
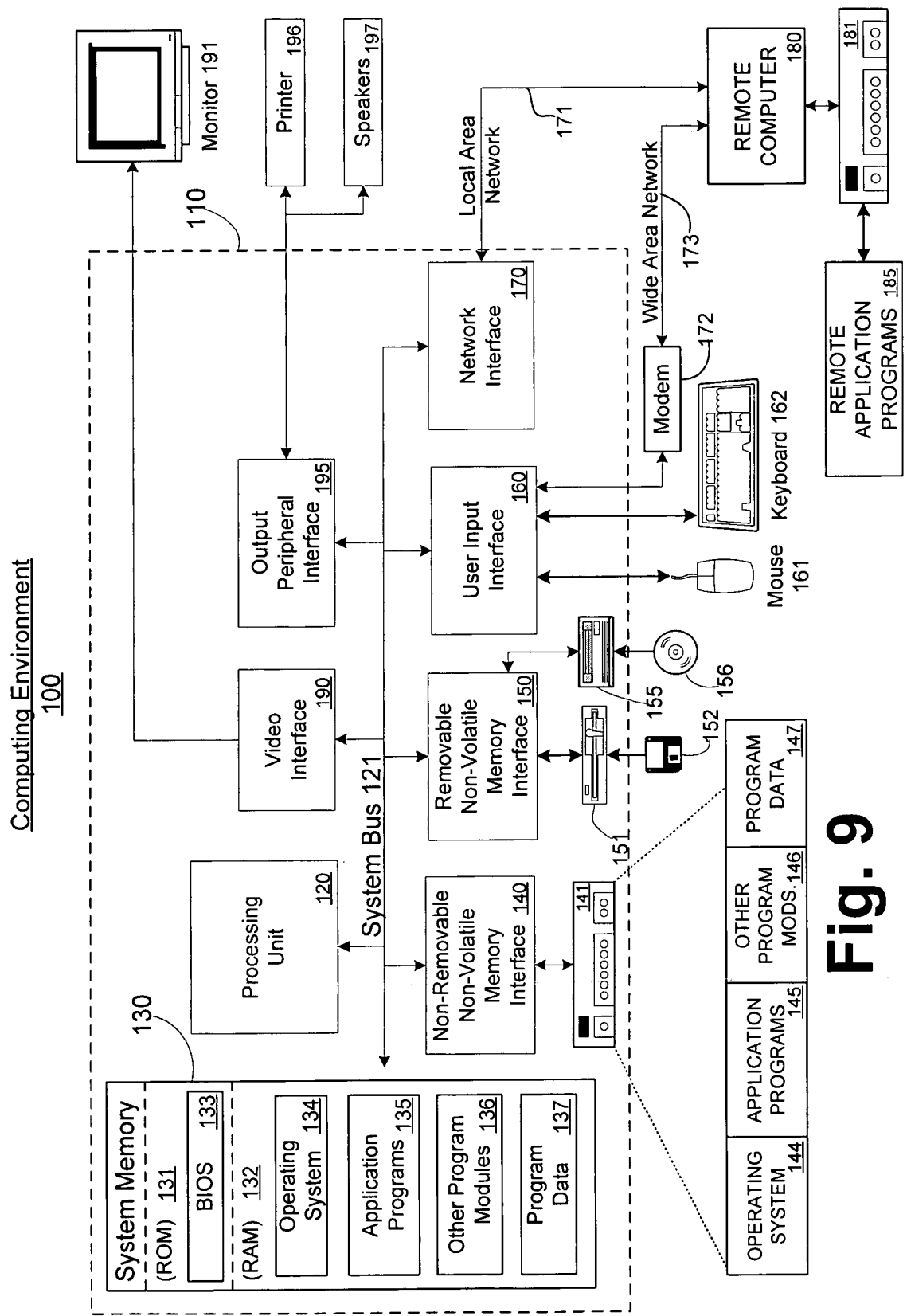
FIG. 9 illustrates an exemplary computing environment in which the present invention may be embodied.

FIG. 9 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/non-volatile computer storage media. By way of example only, FIG. 9 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD- ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 9, provide storage of computer readable instructions, data structures, program modules and other data for the computer 110. In FIG. 9, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181. It will be appreciated that the network connections shown are exemplary and other means of establishing a communications link between the computers may be used.

Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for determining a severity of power disruptions in a geographic region in accordance with weather conditions, comprising:
   receiving weather prediction models;
   generating input layers representative of convective intensity, winds and winter weather conditions; and
   determining a power disruption index value from the input layers.

2. The method of claim 1, wherein generating the input layer representative of convective intensity comprises:
   determining if convective available potential energy is greater than 1000 J/kg;
   determining if storm relative helicity greater than 100 $m^2/s^2$;
   determining if 0–6 km wind shear is greater than 20 kts; and
   determining 12-hour pressure falls at 18,000 feet.

3. The method of claim 1, wherein generating the input layer representative of convective intensity comprises:
   determining if convective available potential energy is greater than 1000 J/kg; and
   determining if 0–6 km wind shear is greater than 20 kts.

4. The method of claim 1, wherein generating the input layer representative of convective intensity comprises:
   determining if temperatures at 10,000 feet are less than 12° C.;
   determining if a K-index is greater than 30; and
   determining if a lifted index is less than zero.

5. The method of claim 1, wherein generating the input layer representative of winds comprises determining wind speeds and wind gusts.

6. The method of claim 5, wherein determining input layers representative of wind gusts comprises:
   determining if a mean of the winds from 1000 to 5000 ft;
   determining a rate at which the temperature cools from 1000 to 5000 ft, and
   if the rate exceeds 7° C. per km, then subtracting 5 kts from the mean of the winds.

7. The method of claim 5, wherein determining input layers representative of wind gusts comprises:
   deriving the mean wind speed maxima from MesoETA and GFS models;
   calculating mean values from the 850 decameter height millibar pressure level to surface level; and
   plotting the calculated mean values as a the input layers representative of wind gusts.

8. The method of claim 1, wherein generating the input layers representative of winter weather conditions comprises determining a snow accumulation, snow wetness, and ice accretion.

9. The method of claim 8, wherein determining input layers representative of snow accumulation comprises:
   averaging snow, rain, ice pellet, and freezing rain probabilities for a predetermined period of time;

outputting a model quantitative precipitation field where a snow conditional probability is higher than all other precipitation conditional probabilities;

averaging a surface temperature for said predetermined period of time;

converting said model quantitative precipitation field into snowfall by using a 15:1 ratio if the average surface temperature is less than 28° F.; and converting said model quantitative precipitation field into snowfall a 10:1 ratio if the average surface temperature is greater than or equal to 28° F.

10. The method of claim 8, wherein determining input layers representative of snow wetness comprises:

determining a snowfall amount for a predetermined period of time;

determining an average surface temperature for said predetermined period of time; and converting the snowfall amount and the average surface temperature to an index.

11. The method of claim 10, wherein converting to said index, comprises:

setting said index to zero where less than 1" of snow is expected or the surface temperature is below 30.5° F.;

assigning said index to one where greater than 1" of snow is expected and average surface temperatures are forecast between 30.5° F. and 32.1° F.; and assigning said index to two when greater than 1" of snow is expected and average surface temperatures are forecast to be greater than 32.1° F.

12. The method of claim 8, wherein generating input layers representative of ice accretion comprises:

calculating ice accretion rates as a function of wind speed by determining an averaging the model conditional freezing rain, rain, ice pellet, and snow probabilities for a predetermined period;

outputting a model quantitative precipitation field for any point where the freezing rain conditional probability is higher than all other precipitation conditional probabilities;

determining an average surface temperature for said predetermined period;

converting the output quantitative precipitation field into accretion by using 80% of the liquid precipitation if the average surface temperature for said predetermined period is below 27° F.; and converting the output quantitative precipitation field into accretion by using 66% if the average surface temperature is at or above 27° F. for said predetermined period.

13. The method of claim 1, wherein determining the power disruption index value from the input layers comprises:

comparing input values of the input layers to determine a highest value of all the input values; and assigning the power disruption index value to the highest value.

14. The method of claim 1, further comprising editing the input layers if an aspect of the expected weather conditions for a specific region are not accurate in the input layers.

15. A system for determining a power disruption index representative of a severity of power outages based on weather conditions in a geographic region, comprising:

a central computing receiving weather prediction models;

a forecast and programming server that generates input layers representative of convective intensity, winds and winter weather conditions, the forecast and programming server utilizing the input layers to determine the power disruption index;

a graphics production server that produces end-user graphical representations of weather conditions forecast by the input layers; and a communications link for providing the power disruption index to subscribers.

16. The system of claim 15, wherein said forecast and programming server generates the input layer representative of convective intensity by:

determining if convective available potential energy is greater than 1000 J/kg;

determining if storm relative helicity greater than 100 m2/s2, determining if 0–6 km wind shear is greater than 20 kts; and determining 12-hour pressure falls at 18,000 feet.

17. The system of claim 15, wherein said forecast and programming server generates the input layer representative of convective intensity by:

determining if convective available potential energy is greater than 1000 J/kg; and determining if 0–6 km wind shear is greater than 20 kts.

18. The system of claim 15, wherein said forecast and programming server generates the input layer representative of convective intensity by:

determining if temperatures at 10,000 feet are less than 12° C.;

determining if a K-index is greater than 30; and determining if a lifted index is less than zero.

19. The system of claim 15, wherein input layers representative winds comprises determining input layers representative of wind speeds and wind gusts.

20. The system of claim 19, wherein said forecast and programming server determines input layers representative of wind gusts by:

determining if a mean of the winds from 1000 to 5000 ft;

determining a rate at which the temperature cools from 1000 to 5000 ft, and if the rate exceeds 7° C. per km, then subtracting 5 kts from the mean of the winds.

21. The system of claim 19, wherein said forecast and programming server determines input layers representative of wind gusts by:

deriving the mean wind speed maxima from MesoETA and GFS models;

calculating mean values from the 850 decameter height millibar pressure level to surface level; and plotting the calculated mean values as a the input layers representative of wind gusts.

22. The system of claim 15, wherein said forecast and programming server generates input layers representative of winter weather conditions by determining input layers representative of snow accumulation, snow wetness, and ice accretion.

23. The system of claim 22, wherein said forecast and programming server determines input layers representative of snow accumulation by:

averaging snow, rain, ice pellet, and freezing rain probabilities for a predetermined period of time;

outputting a model quantitative precipitation field where a snow conditional probability is higher than all other precipitation conditional probabilities;

averaging a surface temperature for said predetermined period of time;

converting said model quantitative precipitation field into snowfall by using a 15:1 ratio if the average surface temperature is less than 28° F.; and converting said model quantitative precipitation field into snowfall a 10:1 ratio if the average surface temperature is greater than or equal to 28° F.

24. The system of claim 22, wherein said forecast and programming server determines input layers representative of snow wetness by:
- determining a snowfall amount for a predetermined period of time;
- determining an average surface temperature for said predetermined period of time;
- converting the snowfall amount and the average surface temperature to an index.

25. The system of claim 24, wherein said forecast determines said index by:
- setting said index to zero where less than 1" of snow is expected or the surface temperature is below 30.5° F.;
- assigning said index to one where greater than 1" of snow is expected and average surface temperatures are forecast between 30.5° F. and 32.1° F.; and
- assigning said index to two when greater than 1" of snow is expected and average surface temperatures are forecast to be greater than 32.1° F.

26. The system of claim 24, wherein said forecast and programming server generates input layers representative of ice accretion by:
- calculating ice accretion rates as a function of wind speed by determining an averaging the model conditional freezing rain, rain, ice pellet, and snow probabilities for a predetermined period;
- outputting a model quantitative precipitation field for any point where the freezing rain conditional probability is higher than all other precipitation conditional probabilities;
- determining an average surface temperature for said predetermined period;
- converting the output quantitative precipitation field into accretion by using 80% of the liquid precipitation if the average surface temperature for said predetermined period is below 27° F.; and
- converting the output quantitative precipitation field into accretion by using 66% if the average surface temperature is at or above 27° F. for said predetermined period.

27. The system of claim 15, wherein said forecast and programming server determines said power disruption index value from the input layers by:
- comparing input values of the input layers to determine a highest value of all the input values; and
- assigning the power disruption index value to the highest value.

28. The system of claim 15, further comprising an editing server and an editing workstation, wherein the editing workstation provides a means to edit the input layers if an aspect of the expected weather conditions for a specific region are not accurate in the input layers.

29. A method of determining a power disruption index indicative of expected power outages within a geographic area expecting severe weather conditions, said method comprising:
- receiving MesoETA and GFS prediction models;
- generating a convective intensity input layer;
- generating a wind gust input layer;
- generating a snow accumulation input layer;
- generating a snow wetness input layer;
- generating an ice accretion layer; and
- determining the power disruption index from the generated layers.

30. The method of claim 29, wherein generating the convective intensity layer comprises:
- determining if convective available potential energy is greater than 1000 J/kg;
- determining if storm relative helicity greater than 100 m2/s2, determining if 0–6 km wind shear is greater than 20 kts; and
- determining 12-hour pressure falls at 18,000 feet.

31. The method of claim 29, wherein generating the convective intensity layer comprises:
- determining if convective available potential energy is greater than 1000 J/kg; and
- determining if 0–6 km wind shear is greater than 20 kts.

32. The method of claim 29, wherein generating the convective intensity layer comprises:
- determining if temperatures at 10,000 feet are less than 12° C.;
- determining if a K-index is greater than 30; and
- determining if a lifted index is less than zero.

33. The method of claim 29, wherein generating the wind gust layer input layer comprises:
- determining if a mean of the winds from 1000 to 5000 ft;
- determining a rate at which the temperature cools from 1000 to 5000 ft, and
- if the rate exceeds 7° C. per km, then subtracting 5 kts from the mean of the winds.

34. The method of claim 29, wherein generating the wind gust layer input layer comprises:
- deriving the mean wind speed maxima from MesoETA and GFS models;
- calculating mean values from the 850 decameter height millibar pressure level to surface level; and
- plotting the calculated mean values as a the input layer representative of wind gusts.

35. The method of claim 29, wherein generating snow accumulation input layer comprises:
- averaging snow, rain, ice pellet, and freezing rain probabilities for a predetermined period of time;
- outputting a model quantitative precipitation field where a snow conditional probability is higher than all other precipitation conditional probabilities;
- averaging a surface temperature for said predetermined period of time;
- converting said model quantitative precipitation field into snowfall by using a 15:1 ratio if the average surface temperature is less than 28° F.; and
- converting said model quantitative precipitation field into snowfall a 10:1 ratio if the average surface temperature is greater than or equal to 28° F.

36. The method of claim 29, wherein generating snow wetness input layer comprises:
- determining a snowfall amount for a predetermined period of time;
- determining an average surface temperature for said predetermined period of time;
- converting the snowfall amount and the average surface temperature to an index, wherein said index is set to zero where less than 1" of snow is expected or the surface temperature is below 30.5° F., set to one where greater than 1" of snow is expected and average surface temperatures are forecast between 30.5° F. and 32.1° F., and set to two when greater than 1" of snow is expected and average surface temperatures are forecast to be greater than 32.1° F.

37. The method of claim 29, wherein generating ice accretion input layer representative comprises:

calculating ice accretion rates as a function of wind speed by determining an averaging the model conditional freezing rain, rain, ice pellet, and snow probabilities for a predetermined period;

outputting a model quantitative precipitation field for any point where the freezing rain conditional probability is higher than all other precipitation conditional probabilities;

determining an average surface temperature for said predetermined period;

converting the output quantitative precipitation field into accretion by using 80% of the liquid precipitation if the average surface temperature for said predetermined period is below 27° F.; and converting the output quantitative precipitation field into accretion by using 66% if the average surface temperature is at or above 27° F. for said predetermined period.

* * * * *